(No Model.)

O. P. LOOMIS.
REGULATION OF COUPLED DYNAMOS.

No. 410,170. Patented Sept. 3, 1889.

Witnesses
Geo. W. Breck.
Edward Thorpe.

Inventor
Osborn P. Loomis
By his Attorneys
Fowler & Fowler.

UNITED STATES PATENT OFFICE.

OSBORN P. LOOMIS, OF NEW YORK, N. Y., ASSIGNOR TO THE LOOMIS ELECTRIC MANUFACTURING COMPANY, OF SAME PLACE.

REGULATION OF COUPLED DYNAMOS.

SPECIFICATION forming part of Letters Patent No. 410,170, dated September 3, 1889.

Application filed April 23, 1889. Serial No. 308,255. (No model.)

*To all whom it may concern:*

Be it known that I, OSBORN P. LOOMIS, a citizen of the United States, residing at New York, county and State of New York, have invented certain new and useful Improvements in Regulating Means for Coupled Dynamos, of which the following is such a full, clear, and exact description as will enable any one skilled in the art to which it appertains to make and use the same, reference being had to the accompanying drawings, forming part of this specification.

My invention relates to the regulation of dynamo-electric machines when two or more of them are connected to a common supply-circuit, and has especial reference to compound-wound dynamos connected in parallel or multiple arc. When compound-wound dynamos are coupled in multiple arc, they tend to interfere with each other's action, so that if one dynamo drops in its electro-motive force it receives some current from the other or others coupled therewith, and this tends to still further lower its electro-motive force and to increase the electro-motive force of the other or others by means of increased current flowing around the series coils of the latter.

The object of my invention is to check this interference of one dynamo with the other and to maintain them in equilibrium.

In accordance with my invention an electric reactive or induction coil is included in the circuit, preferably, of each of the sets of coupled dynamos, so that whenever one dynamo tends to increase and the other tends decrease its electro-motive force these coils by their inductive action mutually act to prevent such disturbing action and to restore the dynamos to their normal condition.

Figure 1:
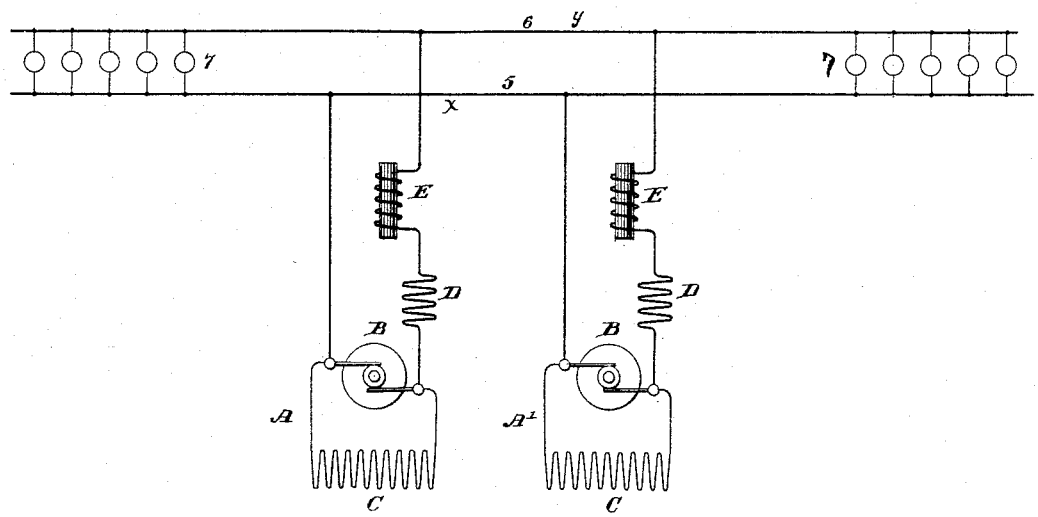
Figure 2:
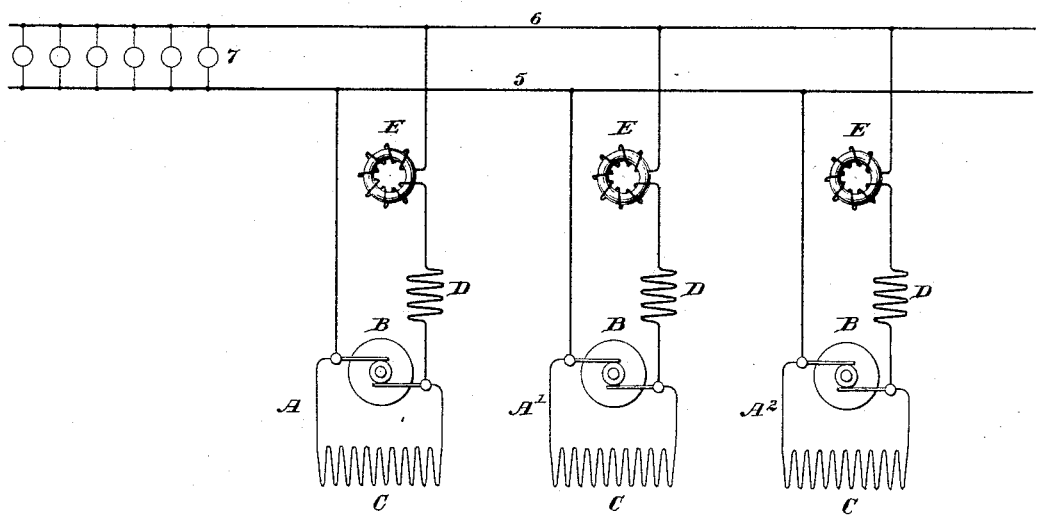

In the accompanying drawings, illustrating my invention, Figures 1 and 2 show diagrammatically the use of my invention with two and three connected dynamos, respectively.

In the said drawings, like letters and numbers of reference designate like and corresponding parts throughout.

Referring to the drawings, A A', &c., represent compound-wound dynamo-electric machines generating a continuous current, and each having an armature B, main or series coils D, and shunt-coils C. These machines are coupled or connected in multiple arc to a common supply-main 5 6, in which are located suitable translating devices, such as 7 7.

In the circuit, preferably, of each dynamo A, &c., and, if preferred, between the armature B thereof and the supply-circuit 5 6, I place a reactive or chocking coil E, which may be of any well-known suitable form. In Fig. 1 the construction of this coil consists in a magnetic bar with the wire of the dynamo-circuit coiled around it. The coil in Fig. 2 is of a slightly-different and more effective form, and consists in an annular magnetic core with the wire of the dynamo-circuit passing around it, as before. The action of each of the coils E, in the relation I employ them, is such that by their inductive or reactive influence upon the current flowing through them the coupled dynamos are automatically regulated in their action.

In Fig. 2 I have shown three dynamos connected in multiple arc to the common supply-main 5 6 and provided each with a regulating-coil E. In this arrangement, as in the other, if one dynamo tends to strengthen and the other to weaken, the coils will come into play and act to restore the equilibrium of the machines. This system may be indefinitely extended, and may be made to include any desired number of dynamos connected, as shown, to a common supply-main circuit in multiple arc.

I am aware that reactive coils have been used heretofore for various other purposes; but so far as I am aware I am the first to use a reactive coil to regulate dynamo-machines connected in multiple arc to a common supply-circuit.

It is obvious that the coils may be located otherwise than shown and the required regulating action may still be secured. The coils may, for instance, be located at points $x$ and $y$ in the main or supply circuit and they will perform their regulating functions.

Having thus described my improvements in the regulation of dynamos coupled in multiple arc, what I claim as my invention, and desire to secure by Letters Patent, is—

The combination, as hereinbefore set forth, of two or more compound-wound dynamo-electric machines connected in multiple arc to a common supply-circuit, and one or more reactive coils placed in the circuit between said dynamos for regulating the action of one dynamo upon the other, for the purpose described.

In testimony whereof I have hereunto set my hand and affixed my seal, in the presence of the two subscribing witnesses, this 12th day of April, 1889.

OSBORN P. LOOMIS. [L. S.]

Witnesses:
PAUL F. C. TUCKER,
WILLIS FOWLER.